United States Patent [19]

Tamori et al.

[11] 4,140,983

[45] Feb. 20, 1979

[54] METHOD FOR AUTOMATICALLY EQUALIZING THE DELAY CHARACTERISTICS OF A TRANSMISSION LINE

[75] Inventors: Michitoshi Tamori; Hidemi Kuroda, both of Tokyo, Japan

[73] Assignee: Kokusai Denshin Denwa Co., Ltd., Tokyo, Japan

[21] Appl. No.: 808,450

[22] Filed: Jun. 21, 1977

[30] Foreign Application Priority Data

Jun. 23, 1976 [JP] Japan .................................. 51-73089

[51] Int. Cl.² .............................................. H03H 7/16
[52] U.S. Cl. ...................................... 333/18; 333/28 R
[58] Field of Search ................................ 333/18, 28 R

[56] References Cited

U.S. PATENT DOCUMENTS

| 3,673,521 | 6/1972 | Yuguchi | 333/28 R |
| 3,748,602 | 7/1973 | Delfrate et al. | 333/28 R |

Primary Examiner—Paul L. Gensler

Attorney, Agent, or Firm—Armstrong, Nikaido, Marmelstein & Kubovcik

[57] ABSTRACT

In a delay equalizer having a plurality of quadratic all pass networks for equalizing the delay characteristics of a circuit, the automatic adjustment of the value of Q of each quadratic all pass network when calculated through the asymptotic formula $$Q_i^{(k+1)} = Q_i^{(k)} - \frac{1}{2} \alpha_i \left( \frac{\partial \epsilon}{\partial Q_i} \right)^{(k)}$$

can provide perfect delay equalization, where $Q_i^k$ is the value of Q of the i'th quadratic all pass network, and $\alpha_i$ is the step size parameter of i'th quadratic all pass network. Before applying said formula, the delay of the circuit to be equalized at the center frequency of each quadratic all pass network is measured, and said formula is calculated according to the result of the measurement.

1 Claim, 5 Drawing Figures

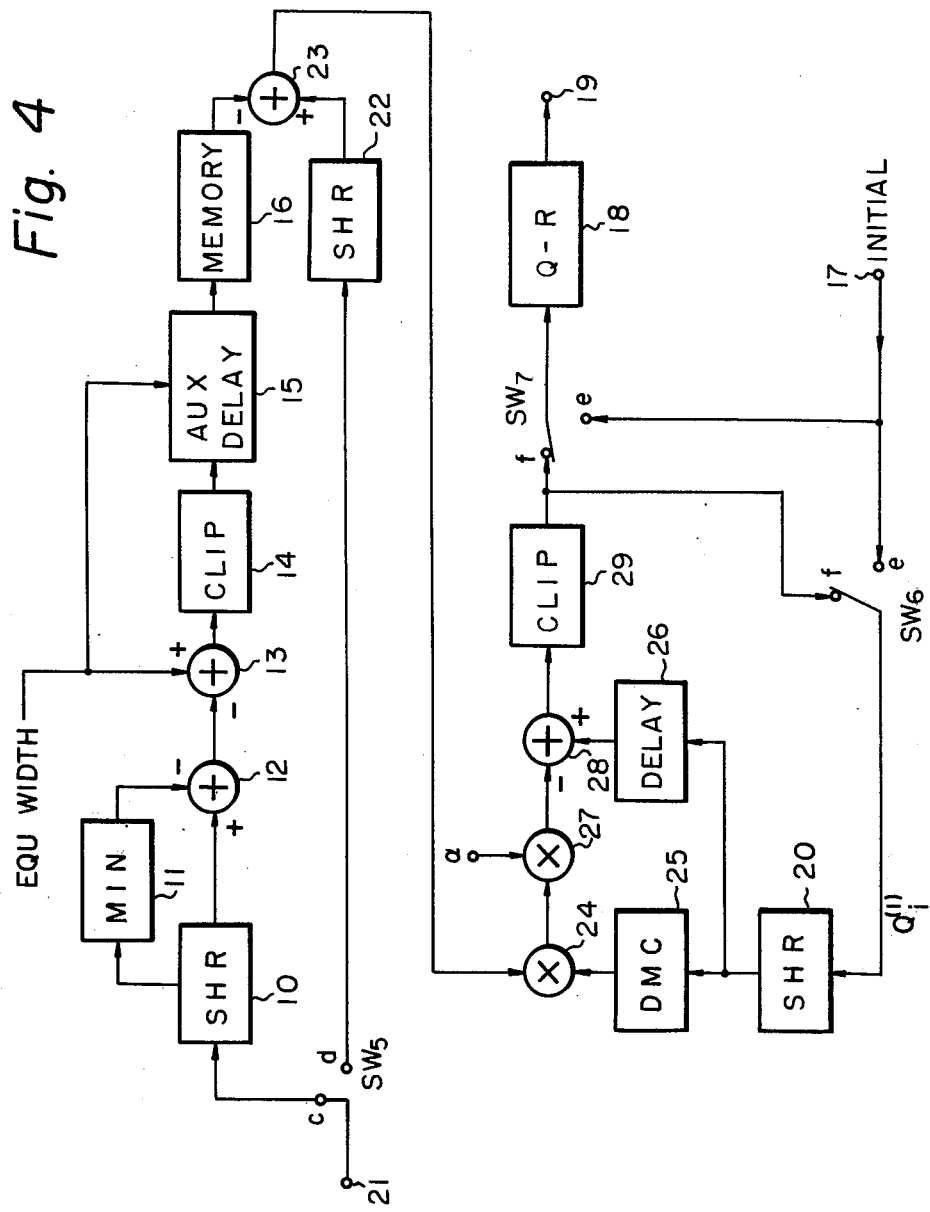

METHOD FOR AUTOMATICALLY EQUALIZING THE DELAY CHARACTERISTICS OF A TRANSMISSION LINE

BACKGROUND OF THE INVENTION

The present invention relates to a method for equalizing the delay characteristics of a circuit, in particular, relates to a method for adjusting the delay equalization characteristics of an equalizer having a plurality of quadratic all pass networks on a frequency axis.

A delay equalizer which has a plurality of quadratic all pass networks on a frequency axis and obtaining the desired delay characteristics from the total of said all pass networks is well known. That is to say, N number of quadratic all pass networks having the delay characteristics $\tau_1, \tau_2, \text{---} \tau_n$ are arranged in the band width, and the total delay characteristics H is obtained from the sum of $\tau_1, \tau_2, \text{----}$ and $\tau_n$.

However, said prior art has the disadvantage that the adjustment of each all pass network is very difficult, since said adjustment had to be accomplished manually and the desired characteristics of a particular all pass network depends upon the characteristics of the other all pass networks. Therefore, the total characteristics of the delay equalizer depend upon the experience and the sixth sense of an operator, and further the resultant characteristic is not always the best one.

SUMMARY OF THE INVENTION

It is an object, therefore, of the present invention to overcome the disadvantage and limitation of a prior delay equalizer by providing a new and improved method for adjusting an equalizer.

The above and other objects are attained by a method for adjusting an equalizer which comprises the steps of measuring the delay of the circuit to be equalized at the center frequencies of a plurality of quadratic all pass networks, obtaining the delay characteristics of eqch quadratic all pass networks, and obtaining the value of Q of each quadratic all pass networks through the asymptotic formula, $$Q_i^{(k+1)} = Q_i^{(k)} - \frac{1}{2} \alpha_i \left( \frac{\partial \epsilon}{\partial Q_i} \right)^{(k)}$$

where $Q_i^k$ is the value of Q of the i'th quadratic all pass network after k'th adjustment cycle, and $\alpha_i$ is the step size parameter of i'th quadratic all pass network.

BRIEF DESCRIPTION OF THE DRAWINGS

The foregoing and other objects, features, and attendant advantages of the present invention will be appreciated as the same become better understood by means of the following description and the accompanying drawings wherein;

FIG. 4 shows the block-diagram of the equalizer control 4 in FIG. 3.

DETAILED DESCRIPTION OF THE PREFERRED EMBODIMENTS

First, the theoretical principle of the present invention will be explained below.

The basic quadratic all pass network utilized in the present invention must change the resonance characteristics, that is to say, the value of Q of the circuit, by changing a value of a resistance and/or a capacitance included in the circuit of the all pass network. And as long as said condition is satisfied, any configuration of an all pass network is possible. In any configuration the quadratic all pass network function is shown in the formula (1) below.

$$\frac{V_2}{V_1} = T(S) = \frac{S^2 - \frac{\omega_o}{Q} S + \omega_o^2}{S^2 + \frac{\omega_o}{Q} S + \omega_o^2} \quad (1)$$

where
$V_1$; input voltage
$V_2$; output voltage
S; complex frequency
Q; Q of the quadratic all pass network
$\omega_o$; center frequency in $\omega$ of the quadratic all pass network From the formula (1), the delay characteristic is obtained as shown in the formula (2).

$$\tau(\omega) = \frac{\frac{2Q}{\omega_o} \left(1 + \frac{\omega^2}{\omega_o^2}\right)}{\frac{\omega^2}{\omega_o^2} + Q^2 \left(1 - \frac{\omega^2}{\omega_o^2}\right)^2} \quad (2)$$

Figure 1:
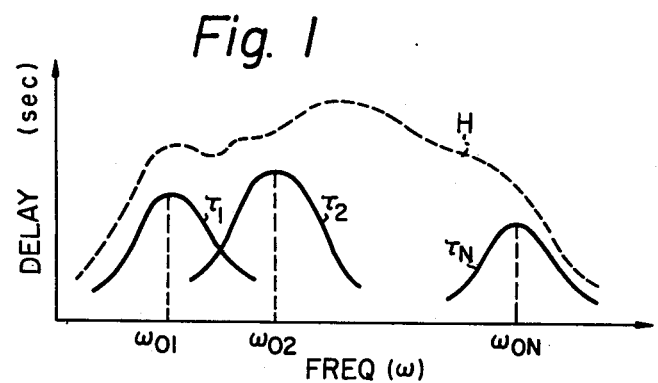
FIG. 1 shows a curve showing the individual characteristics of a plurality of quadratic all pass networks and the total characteristics of the same.

The formula (2) shows the delay characteristics of each quadratic all pass network $\tau_1, \tau_2, \text{----}, \tau_n$ shown in FIG. 1. According to the present invention, the value of Q of each quadratic all pass network is obtained from the N number of discrete delay information measured in the circuit to be equalized. Now, the formula (2) can be changed as follows by introducing the suffix (i).

$$\tau(Q_i, \omega) = \frac{\frac{2Q_i}{\omega_{oi}} \left(1 + \frac{\omega^2}{\omega_{oi}^2}\right)}{\frac{\omega^2}{\omega_{oi}^2} + Q_i^2 \left(1 - \frac{\omega^2}{\omega_{oi}^2}\right)^2} \quad (3)$$

In the formula (3), the center frequency is supposed to be a constant having the sequence number of the frequency axis, since if the center frequency changes, the circuit becomes complicated and many resistances and capacitances must be adjusted.

Although many theories for solving the function $Q_i$ are applicable, the steepest descent method is the most desirable, since the delay characteristics and the differential characteristics of the same are obtained analytically. The steepest descent method is defined in the formula (4).

$$Q_i^{(k+1)} = Q_i^{(k)} - \frac{1}{2} \alpha_i \cdot \left( \frac{\partial \epsilon}{\partial Q_i} \right)^{(k)} \quad (4)$$

where $\alpha_i$ is the step size parameter, the suffix k shows the repetition number (number of adjustment), and $\epsilon$ is the error.

The formula (5) is defined as the evaluation function by introducing the square errors. In the formula (5), the suffix k is omitted for the sake of simplicity.

$$\epsilon = \sum_{j=1}^{N} (H(\underline{Q})|\omega = \omega_j - y_j)^2 \quad (5)$$

In the formula (5), $H(\underline{Q})|\omega=\omega_j$ means the sampling of the function $H(\underline{Q})$ at $\omega=\omega_j$, and $H(\underline{Q})|\omega=\omega_j$ is shown below considering the correlation of the basic circuits.

$$H(\underline{Q})|\omega = \omega_j = \sum_{i=1}^{N} \tau(Q_i, \omega_j) \quad (6)$$

$y_j$ in the formula (5) is the sampled value of the desired delay characteristics, and $y_j$ is the constant during the repetition cycle after the measurement. The center frequency in radians of the basic circuit is usually the same as the sampled frequency in radians of the delay characteristics, however, it is not necessarily the same. Further, the accuracy of equalization can be improved by setting more sampled points than the number of basic circuits.

The formula (7a) is obtained by differentiating the formula (5) by $Q_i$.

$$\frac{\partial \epsilon}{\partial Q_i} = \text{diag.} (2) \cdot \begin{pmatrix} \frac{\partial}{\partial Q_1} H(\underline{Q})|_{\omega=\omega_1} & \frac{\partial}{\partial Q_1} H(\underline{Q})|_{\omega=\omega_2} & \cdots & \frac{\partial}{\partial Q_1} H(\underline{Q})|_{\omega=\omega_N} \\ \frac{\partial}{\partial Q_2} H(\underline{Q})|_{\omega=\omega_1} & \frac{\partial}{\partial Q_2} H(\underline{Q})|_{\omega=\omega_2} & \cdots & \frac{\partial}{\partial Q_2} H(\underline{Q})|_{\omega=\omega_N} \\ \vdots & \vdots & \ddots & \vdots \\ \frac{\partial}{\partial Q_N} H(\underline{Q})|_{\omega=\omega_1} & \frac{\partial}{\partial Q_N} H(\underline{Q})|_{\omega=\omega_2} & \cdots & \frac{\partial}{\partial Q_N} H(\underline{Q})|_{\omega=\omega_N} \end{pmatrix} \begin{pmatrix} H(\underline{Q})|_{\omega=\omega_1} - y_1 \\ H(\underline{Q})|_{\omega=\omega_2} - y_2 \\ \vdots \\ H(\underline{Q})|_{\omega=\omega_N} - y_N \end{pmatrix} \quad (7a)$$

The ( i, j ) element in the matrix in the formula (7a) is shown in the formula (7b).

$$\frac{\partial}{\partial Q_i} H(\underline{Q}) | \omega=\omega_j = \quad (7b)$$

$$\frac{2}{\omega_{oi}} \left(1 + \frac{\omega_j^2}{\omega_{oi}^2}\right) \frac{\left\{\frac{\omega_j^2}{\omega_{oi}^2} - Q_i^2 \left(1 - \frac{\omega_j^2}{\omega_{oi}^2}\right)^2\right\}}{\left\{\frac{\omega_j^2}{\omega_{oi}^2} + Q_i^2 \left(1 - \frac{\omega_j^2}{\omega_{oi}^2}\right)^2\right\}^2}$$

Accordingly, the formulas (7a) and (7b) give the slope of the error $\partial\epsilon/\partial Q_i$ utilized to solve the formula (4).

Now, the step size parameter $\alpha_i$ will be explained. $1/\omega_{oi}$ in the formula (7b) is independent from the direction of the error shown by the change of $Q_i$. Accordingly, $\alpha_i$ is expressed as follows in order to cancel the same by $\alpha_i$ in the formula (4).

$$\alpha_i = \alpha \cdot \omega_{oi} \quad (8)$$

where $\alpha$ is the constant. It is a matter of course that the value $1/\omega_{oi}$ in the formula (7b) and the value $\omega_{oi}$ in the formula (8) which are cancelled by each other are removed beforehand in the actual calculation.

Further, in the present equalizer, since the center frequency $\omega_o$ of each quadratic all pass network is different from the others, the ratio of the change of phase to the change of the value $Q_i$ is different in each phase shifter. Therefore, in order to obtain the uniform average change ratio of the phase, the change of the value $Q_i$ must have the weight, thus said value $\alpha_i$ has the weight $\omega_{oi}/\omega_{ol}$.

The desired value of Q in each circuit is obtained by adjusting the circuits repetitively until $Q_i^{(k+1)}$ becomes almost equal to $Q_i^k$. And by setting each quadratic all pass network according to the value Q thus obtained, the desired delay equalization characteristic is obtained.

Now, the apparatus according to the present invention will be explained with reference to the drawings.

Figure 2A:
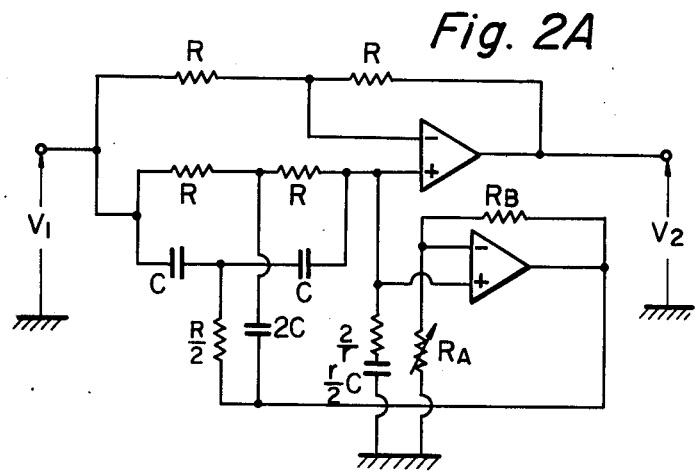
FIG. 2(A) and FIG. 2(B) show embodiments of circuit diagrams of a quadratic all pass network.
Figure 2B:
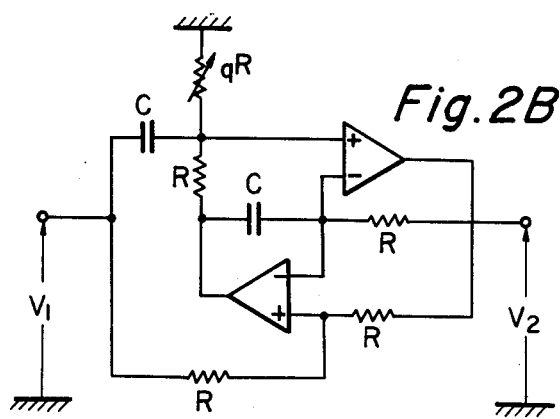

The all pass network utilized in the present invention is shown in FIGS. 2(A) and 2(B). FIG. 2(A) is an embodiment of a quadratic all pass network using an operational amplifier. The transfer function of the circuit in FIG. 2(A) is shown below and the value Q of the circuit can be adjusted by changing either the value of the resistance $R_A$ or $R_B$.

$$\frac{V_2}{V_1} = T(S) = \frac{S^2 - \frac{\omega_o}{Q} S + \omega_o^2}{S^2 + \frac{\omega_o}{Q} S + \omega_o^2} \quad (9)$$

where, $Q = r - 4\rho$, $\rho = R_B/R_A$, $\omega_o = 1/RC$, and r is constant.

FIG. 2(B) is another embodiment of a quadratic all pass network using an operational amplifier. The transfer function of the circuit FIG. 2(B) is given by the formula (9).

Figure 3:
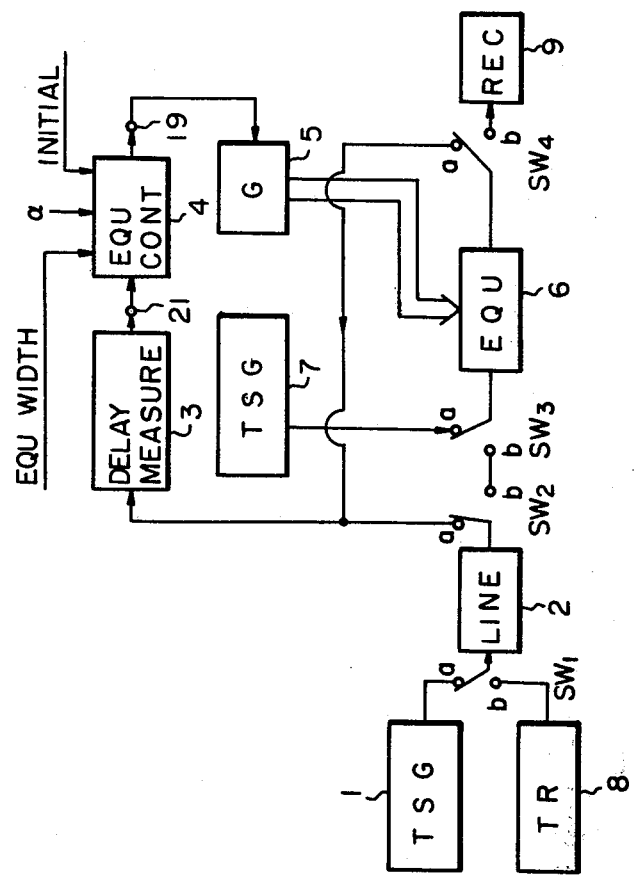
FIG. 3 shows the embodiment of the delay equalizer according to the present invention.

FIG. 3 is a circuit diagram of the present delay equalizer. According to the present invention, the switches SW1, SW2, SW3 and SW4 are so set that the movable contacts are connected to the fixed contacts (a) at first. The signal generated in the test signal generator 1 is applied to the delay mesuring apparatus 3 through the transmission circuit 2, and the apparatus 3 measures the value of the delay in the transmission circuit 2 at a plurality of frequencies which coincide with the center frequency $\omega_{oi}$ in each basic all pass network. However, it should be noted that the measured frequency does not need to coincide exactly with the center frequency of each all pass network, as explained before. The measure values are stored in the equalizer control 4, which receives also the initial setting value, the setting value of the equalization width, and $\alpha$. Said initial setting value is applied to the equalizer to be adjusted 6 through the gate circuit 5, and then the variable resistors in the equalizer 6 are initially adjusted to said initial setting value. Then, the delay characteristic of the equalizer thus initially adjusted is measured by the test signal generator 7 and the delay measuring apparatus 3. The measured values are stored in the shift-register in the equalizer control 4. Next, the equalizer control 4 provides the information for defining the value Q of each basic all pass network, and said information is applied to the equalizer 6 through the gate circuit 5, and thus the resistors in each basic circuit are adjusted and the first adjustment of $Q_i$ (that is to say, $Q_i^{(1)}$) is finished. Next, the test signal generator 7 provides a test signal to the equalizer 6 in order to measure the delay characteristics of the equalizer 6 after the initial adjustment, and the equalizer control 4 receives the revised information concerning $Q_i^{(2)}$ and adjusts the equalizer 6 again. The adjustment cycle explained above is repeated until the equalization characteristics of the equalizer 6 reaches approximately the inverse characteristics of the transmission line, and the adjustment operation is finished when the error between the actual characteristics of the equalizer and the desired inverse characteristics of the transmission line reaches an allowable small value. Next, the switches SW1, SW2, SW3 and SW4 are switched to the contacts (b), then the equalizer 6 is connected to the transmitter 8, the transmission line 2 and the receiver 9, and the actual signal transmission starts.

FIG. 4 shows the detailed block-diagram of the equalizer control 4 in FIG. 3.

The switch 5 is connected to the contact (c) when the test signal is transmitted from the transmission station through the transmission line 2 (FIG. 2). Accordingly, the measured value concerning the characteristics of the transmission line by said test signal is applied to the shift register 10 and the minimum value detector 11. The output of the shift register 10 provided in sequence is applied to the subtractor 12, which subtracts the output of the minimum value detector 11 from the output of the shift-register 10. Thus the output of the shift-register 10 is normalized. The output of said subtractor 12 is subtracted in another subtractor 13 from a predetermined equalization duration and the output of the subtractor 13 provides the inversed delay characteristics. The output of the subtractor 13 is applied to the memory 16 through the clipper 14 and the auxiliary delay circuit 15, and is stored in the memory 16. The clipper 14 changes the negative outputs of the subtractor 13 to zero, and the auxiliary delay circuit 15 provides a predetermined delay to the output of the clipper 14. It should be appreciated that the value stored in the memory 16 is the equalization characteristic $y_j$. The auxiliary delay circuit 15 facilitates the rapid convergence of $Q_i$ of each basic circuit by providing a predetermined delay to the inverse characteristic. Said auxiliary delay is usually inversely proportional to the equalization duration.

When all the equalization characteristics $y_j$ are stored in the memory 16, the switch 5 is connected to the contact (d) and the switches 6 and 7 are switched to the contacts (e). When the initial value $Q_i^{(1)}$ is applied to the input terminal 17 from the outside apparatus, said initial value is applied to the Q-R convertor 18 through the switch SW7 and to the shift register 20 through the switch SW6 to adjust the value of $R_A$. The output of the Q-R convertor 18 is applied to the equalizer 6 (FIG. 2) through the output terminal 19. When the variable resistors in the equalizer 6 are initially adjusted as explained above by the initial adjustment $Q_i^{(1)}$, the characteristic of the equalizer is measured and the result of the measurement is applied to the shift register 22 through the input terminal 21 and the switch SW5. Said result applied to the shift register 22 is $$H(Q)\mid_{\omega=\omega_j}^{(1)}$$

explained above. At this point, the switches SW6 and SW7 are connected to the contacts (f). Now, the content of the memory 16 and the content of the shift register 22 are applied to the subtractor 23, the output of which relating to $$H(Q)\mid_{\omega=\omega_j}^{(1)} - y_j$$

is applied to one input of the multiplier 24. On the other hand, the output of the shift register 20 having the initial value $Q_i^{(1)}$ is also applied to the other input of the multiplier 24 through the differential matrix calculator 25, which provides the differential matrix in the formula (7a). The output of the shift register 20 is also applied to the delay circuit 26. The output of the multiplier 24, which is the product of the output of the subtractor 23 and the output of the differential matrix calculator 25, is multiplied by a constant in the multiplier 27, the output of which is $$\frac{1}{2}\alpha \cdot \left(\frac{\partial \epsilon}{\partial Q_i}\right)$$

in the formula (4). Since the output of the delay circuit 26 is $Q_i^{(1)}$ the subtractor 28 provides the right side of the formula (4). The clipper 29 changes the negative output of the subtractor 28 to zero. It should be noted that the output of the clipper 29 is $Q_i^{(2)}$, and this output is applied to the equalizer 6 in FIG. 3 through the Q-R convertor 18 and the output terminal 19. The output of the clipper 29 is also applied to the shift register 20 for the next repetition cycle.

As explained above, according to the present invention, when the initial value is set, the adjustment of the equalizer is automatically accomplished, and the solution $Q_i^{(2)}, Q_i^{(3)}, \ldots, Q_i^{(k)}$ is obtained sequentially, and finally the goal solution $Q_i^{(k)}$ is obtained.

The structure of the Q-R convertor 18 in FIG. 4 depends upon the configuration of the basic quadratic all pass network, and it should be appreciated that said structure of the Q-R convertor is usually simple, since the value Q of a quadratic all pass network is obtained by $Q=f(R_A)$ as the function of a variable resistance $R_A$ and is obtained through a simple addition and/or subtraction. For instance, $Q=r-4(R_B/R_A)$ for the circuit of FIG. 2(A).

The test signal generator 7 in FIG. 3 is necessary when the value $H(Q)\mid\omega=\omega_j$ is obtained through the measurement. However, it should be noted that said test signal generator 7 can be omitted if said value is obtained through the calculation according to the formulas (3) and (6).

As explained above in detail, according to the present invention, the desired value of Q of each quadratic all pass network is automatically obtained, and the equalization characteristic is easily adjusted. Thus, the present invention has the effects that the operation of the adjustment of an equalizer is simplified and the accuracy of the adjustment is improved. Further, the steepest descent method used in the present invention through the analysis of the delay characteristics of a quadratic all pass network and the differential of the same simplifies the structure of the apparatus.

From the foregoing it will now be apparent that a new and improved equalization adjustment has been found. It should be understood of course that the embodiments disclosed are merely illustrative and are not intended to limit the scope of the invention. Reference should be made to the appended claims, therefore rather than the specification as indicating the scope of the invention.

What is claimed is:

1. A method for automatically adjusting an equalizer having a plurality of quadratic all pass networks on a frequency axis for equalizing the delay characteristics of a transmission line comprising the steps of
   (a) measuring the delay distortion of the transmission line to be equalized at the center frequencies of each quadratic all pass network in order to obtain the equalized delay characteristics,
   (b) obtaining the group delay characteristics $\tau(\omega)$ of each quadratic all pass network,
   (c) obtaining the value of Q of each quadratic all pass network through the calculation of the following formula using said equalized delay characteristics in the step (a) and the delay characteristics of each all pass network in the step (b), $$Q_i^{(k+1)} = Q_i^{(k)} - \frac{1}{2} \alpha_i \left( \frac{\partial \epsilon}{\partial Q_i} \right)^{(k)}$$

where $\alpha_i$ has the weight $\omega_{oi}/\omega_{ol}$, where $Q_i^k$ is the value of Q of the i'th quadratic all pass network in the k'th adjusting cycle, $\alpha_i$ is the step size parameter, $\omega_{oi}$ is the center frequency in radians of the i'th quadratic all pass network, and $\epsilon$ is the mean square error between the group delay characteristics of the equalizer and the sampled value of the desired delay characteristics,
   (d) adjusting each of said quadratic all pass networks using the value of Q obtained in the paragraph (c), and
   (e) repeating said steps (a), (b) and (c) until the circuit is substantially equalized.

* * * * *